(12) United States Patent
Zhao et al.

(10) Patent No.: US 12,546,539 B2
(45) Date of Patent: Feb. 10, 2026

(54) HEAT EXCHANGE APPARATUS AND HEAT PUMP SYSTEM PROVIDED WITH SAME

(71) Applicant: SANHUA (HANGZHOU) MICRO CHANNEL HEAT EXCHANGER CO., LTD., Hangzhou (CN)

(72) Inventors: Lei Zhao, Hangzhou (CN); Jianlong Jiang, Hangzhou (CN); Haobo Jiang, Hangzhou (CN)

(73) Assignee: SANHUA (HANGZHOU) MICRO CHANNEL HEAT EXCHANGER CO., LTD., Hangzhou (CN)

( * ) Notice: Subject to any disclaimer, the term of this patent is extended or adjusted under 35 U.S.C. 154(b) by 0 days.

(21) Appl. No.: 18/760,315

(22) Filed: Jul. 1, 2024

(65) Prior Publication Data
US 2024/0353181 A1  Oct. 24, 2024

Related U.S. Application Data

(60) Division of application No. 17/352,502, filed on Jun. 21, 2021, now Pat. No. 12,055,349, which is a continuation of application No. PCT/CN2019/126985, filed on Dec. 20, 2019.

(30) Foreign Application Priority Data

Dec. 21, 2018 (CN) .......................... 201822166891.4

(51) Int. Cl.
| | | |
|---|---|---|
| F25B 39/00 | (2006.01) | |
| F25B 39/04 | (2006.01) | |
| F28D 1/047 | (2006.01) | |
| F28D 7/00 | (2006.01) | |
| F28F 1/08 | (2006.01) | |
| F28F 9/02 | (2006.01) | |
| F28F 1/32 | (2006.01) | |

(52) U.S. Cl.
CPC ............ F28D 7/0016 (2013.01); F25B 39/04 (2013.01); F28D 1/0476 (2013.01); F28F 1/08 (2013.01); F28F 9/0243 (2013.01); *F25B 2339/0446* (2013.01); *F28F 1/32* (2013.01); *F28F 2260/02* (2013.01)

(58) Field of Classification Search
CPC .............. F25B 39/04; F25B 2339/0446; F25B 2400/16
See application file for complete search history.

(56) References Cited

U.S. PATENT DOCUMENTS 5,685,364 A * 11/1997 Harris ..................... F28F 9/002
62/509

FOREIGN PATENT DOCUMENTS

JP       2005282889 A  * 10/2005

* cited by examiner

*Primary Examiner* — Eric S Ruppert
(74) *Attorney, Agent, or Firm* — FBT Gibbons LLP (57) ABSTRACT

A heat exchange apparatus and a heat pump system provided with same are provided. The heat exchange apparatus includes a heat exchanger and a refrigerant adjustment container with an opening, the heat exchanger includes a first header, a second header and a plurality of heat exchange tubes, two ends of each heat exchange tube are respectively connected to the first header and the second header so as to connect the first header and the second header, and the opening of the refrigerant adjustment container is either of the first header and the second header.

5 Claims, 5 Drawing Sheets

HEAT EXCHANGE APPARATUS AND HEAT PUMP SYSTEM PROVIDED WITH SAME

CROSS-REFERENCE TO RELATED APPLICATION

The present application is a divisional application of U.S. patent application Ser. No. 17/352,502, the entire disclosures of which are incorporated herein by reference.

FIELD

The present application relates to the field of heat exchange technologies, and in particular, to a heat exchange apparatus and a heat pump system provided with the heat exchange apparatus.

BACKGROUND

Household and commercial heat pump air-conditioning systems in related technologies use four-way reversing valves for mode conversion. In a cooling mode, an indoor heat exchanger is used as an evaporator, and an outdoor heat exchanger is used as the condenser. In a heating mode, the indoor heat exchanger is used as a condenser, and the outdoor heat exchanger is used as an evaporator.

Due to different sizes and volumes of the indoor heat exchanger and the outdoor heat exchanger, an amount of exchanged heat and an energy efficiency ratio on the indoor side vary in the two modes of cooling and heating, which reduces efficiency of a heat pump system.

SUMMARY

In view of this, the present application proposes a heat exchange apparatus, where the heat exchange apparatus has a refrigerant adjustment container for adjusting refrigerant in a system, so as to improve system efficiency.

The present application further proposes a heat pump system provided with the foregoing heat exchange apparatus.

A heat exchange apparatus according to an embodiment of a first aspect of the present application includes: a heat exchanger and a refrigerant adjustment container with an opening. The heat exchanger includes a first header, a second header and a plurality of heat exchange tubes, two ends of each heat exchange tube are respectively connected to the first header and the second header so as to connect the first header and the second header, each heat exchange tube includes straight sections and a bent section between the straight sections, bent sections of the plurality of heat exchange tubes include a bent concave part, the opening of the refrigerant adjustment container is connected to either of the first header and the second header, the refrigerant adjustment container is a refrigerant adjustment pipe, and the refrigerant adjustment pipe includes a first pipe section located in the bent concave part and a second pipe section connected between the first pipe section and the either header.

According to the heat exchange apparatus in this embodiment of the present application, the refrigerant adjustment container including the first pipe section and the second pipe section is disposed, the first pipe section is located in the bent concave part of the bent section of the heat exchange tube, and the second pipe section is connected between the first pipe section and the either header, so that an amount of exchanged heat and an energy efficiency ratio on the indoor side can be stabilized in both a cooling mode and a heating mode, thereby improving efficiency of the heat pump system.

A heat exchange apparatus according to an embodiment of a second aspect of the present application includes: a heat exchanger and a refrigerant adjustment container with an opening. The heat exchanger includes a first header, a second header and a plurality of heat exchange tubes, two ends of each heat exchange tube are respectively connected to the first header and the second header so as to connect the first header and the second header, and the opening of the refrigerant adjustment container is connected to either of the first header and the second header.

A heat pump system according to an embodiment of a third aspect of the present application includes: a compressor, an indoor heat exchanger, and an outdoor heat exchanger. An internal volume of one of the outdoor heat exchanger and the indoor heat exchanger is larger than that of the other heat exchanger, and the other heat exchanger includes a first header, a second header and a plurality of heat exchange tubes, two ends of each heat exchange tube are respectively connected to the first header and the second header so as to connect the first header and the second header, each heat exchange tube comprises straight sections and a bent section between the straight sections, bent sections of the plurality of heat exchange tubes comprise a bent concave part, the opening of the refrigerant adjustment container is connected to either of the first header and the second header, the refrigerant adjustment container is a refrigerant adjustment pipe, and the refrigerant adjustment pipe comprises a first pipe section located in the bent concave part and a second pipe section connected between the first pipe section and the either header.

DETAILED DESCRIPTION

Embodiments of the present application are described in detail below, and examples of the embodiments are shown in the accompanying drawings. The embodiments described below with reference to the accompanying drawings are examples, and are intended to explain the present application, but shall not be understood as a limitation to the present application. In the description of the present application, it should be understood that an orientation or positional relationship indicated by the term "center", "longitudinal", "transverse", "length", "width", "thickness", "upper", "lower", "front", "back", "left", "right", "vertical", "horizontal", "top", "bottom", "internal", "external", "clockwise", "counterclockwise", "axial direction", "radial direction", "circumferential direction", or the like is based on an orientation or positional relationship shown in the accompanying drawings, and is merely for ease of describing the present application and simplifying the description, but does not indicate or imply that an apparatus or element referred to must have a specific orientation or be constructed and operated in a specific orientation, and therefore cannot be understood as a limitation to the present application.

The following describes a heat exchange apparatus and a heat pump system according to embodiments of the present application.

The heat pump system according to the embodiments of the present application includes a compressor, an indoor heat exchanger, and an outdoor heat exchanger. A volume of one of the outdoor heat exchanger and the indoor heat exchanger is larger than that of the other heat exchanger. In other words, the volume of the indoor heat exchanger is different from that of the outdoor heat exchanger. For example, the volume of the indoor heat exchanger is greater than the volume of the outdoor heat exchanger, or the volume of the outdoor heat exchanger is greater than the volume of the indoor heat exchanger.

The other heat exchanger above is a heat exchange apparatus according to an embodiment of the present application. In other words, when the volume of the indoor heat exchanger is greater than the volume of the outdoor heat exchanger, the outdoor heat exchanger is the heat exchange apparatus according to the embodiment of the present application; when the volume of the outdoor heat exchanger is greater than the volume of the indoor heat exchanger, the indoor heat exchanger is the heat exchange apparatus according to the application.

The following describes, with reference to the accompanying drawings FIG. 1 to FIG. 4, a heat exchange apparatus according to an aspect of the present application.

Figure 1:
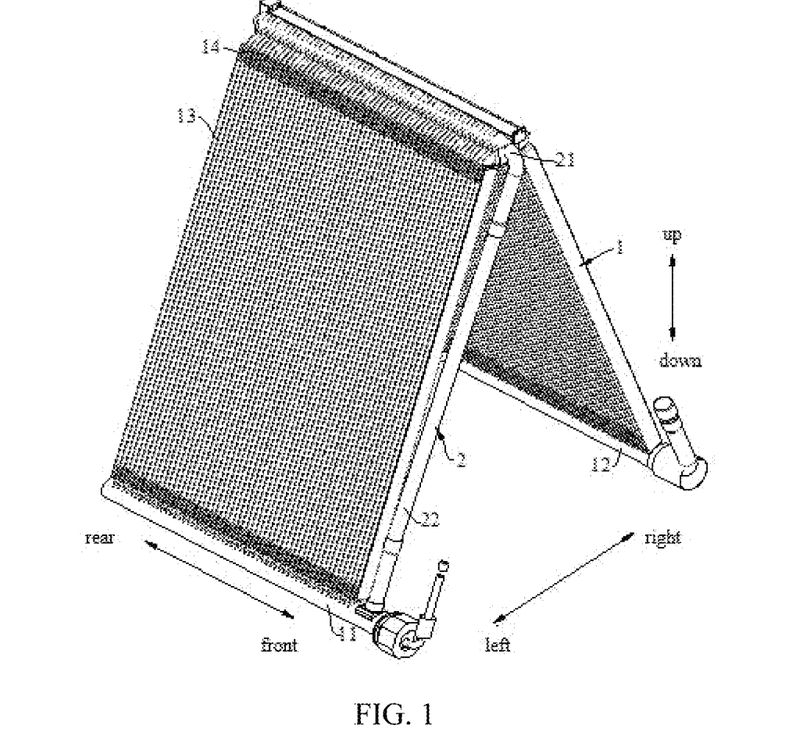
FIG. 1 is a schematic structural diagram of a heat exchange apparatus according to an embodiment of the present application.

As shown in FIG. 1, the heat exchange apparatus according to the embodiment of the present application includes a heat exchanger 1 and a refrigerant adjustment container 2. The heat exchanger 1 includes a first header 11, a second header 12 and a plurality of heat exchange tubes 13, and two ends of each heat exchange tube 13 are respectively connected to the first header 11 and the second header 12 so as to connect the first header 11 and the second header 12.

To be specific, as shown in FIG. 1, the first header 11 and the second header 12 both extend in a front-rear direction and are spaced apart in a left-right direction. One end of each heat exchange tube 13 is connected to the first header 11, and an inner chamber of the heat exchange tube 13 is connected to an inner chamber of the first header 11. The other end of each heat exchange tube 13 is connected to the second header 12, and the inner chamber of the heat exchange tube 13 is connected to an inner chamber of the second header 12.

In the description of the present application, the terms "first" and "second" are merely used for descriptive purposes, but cannot be understood as indicating or implying relative importance or implicitly indicating a quantity of indicated technical features. Therefore, the features defined with "first" and "second" may explicitly or implicitly include at least one of the features. In addition, unless otherwise specifically defined, "a plurality of" means at least two, for example, two or three.

Figure 2:
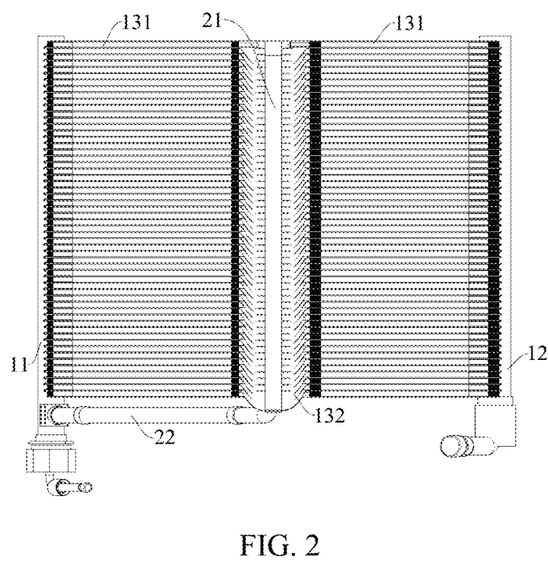
FIG. 2 is a schematic top view of FIG. 1.
Figure 3:
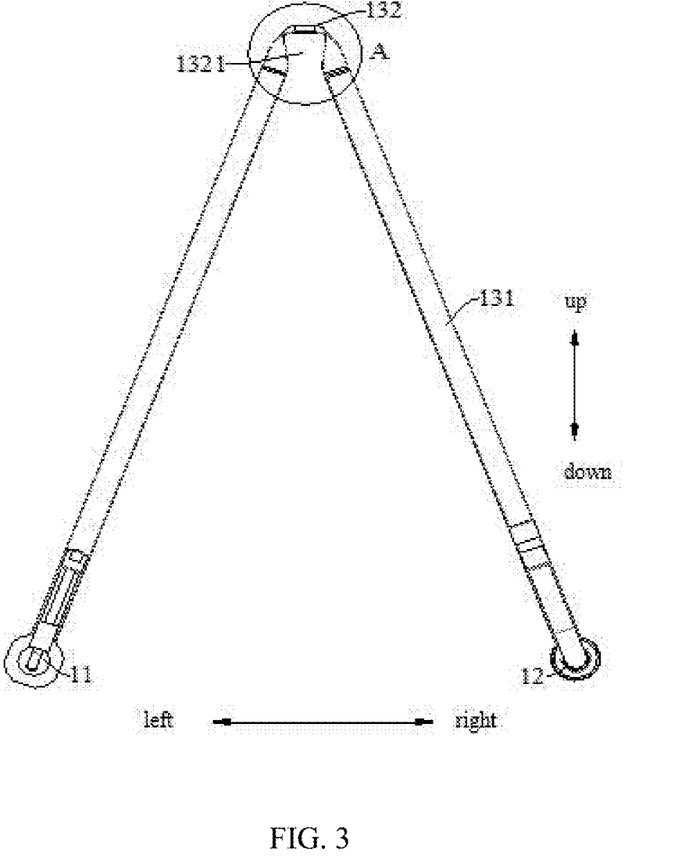
FIG. 3 is a schematic side view of FIG. 1.

Each heat exchange tube 13 includes straight sections 131 and a bent section 132 located between the straight sections 131, and bent sections 132 of the plurality of heat exchange tubes 13 include a bent concave part 1321. To be specific, as shown in FIG. 1 to FIG. 3, the heat exchanger 1 is a bent heat exchanger, and the heat exchange tube 13 of the heat exchanger 1 is formed through bending. The bent section 132 is approximately located in the middle of the heat exchange tube 13, a straight section 131 on the left side of the bent section 132 extends from bottom to top right, and a top right end of the straight section 131 is connected to a left end of the bent section 132. A straight section 131 on the right side of the bent section 132 extends from bottom to top left, and a top left end of the straight section 131 is connected to a right end of the bent section 132. In addition, the bent section 132 includes the bent concave part 1321 that is concave from bottom to top. The heat exchange tube 13 is in an inverted V shape by disposing the bent section 132 at an approximately middle position. It can be understood that a shape of the heat exchange tube 13 is not limited thereto. For example, the heat exchange tube 13 is bent to be V-shaped, C-shaped, or the like.

Figure 4:
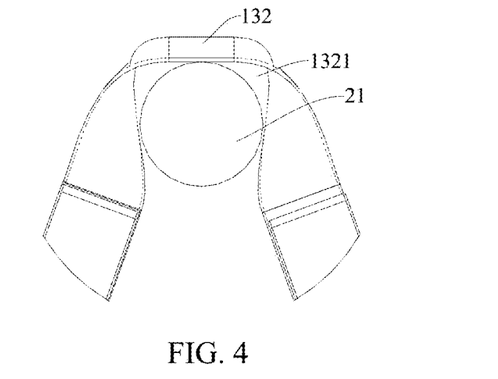
FIG. 4 is a partially enlarged view of A in FIG. 3.

The refrigerant adjustment container 2 has an opening, and the opening is connected to either of the first header 11 and the second header 12. The refrigerant adjustment container 2 is a refrigerant adjustment pipe, and the refrigerant adjustment pipe includes a first pipe section 21 in the bent concave part 1321 and a second pipe section 22 connected between the first pipe section 21 and the foregoing either header. To be specific, as shown in FIG. 1, FIG. 3, and FIG. 4, the refrigerant adjustment container 2 includes the first pipe section 21 and the second pipe section 22. The first pipe section 21 is connected to a top end of the second pipe section 22, and an inner chamber of the first pipe section 21 is connected to an inner chamber of the second pipe section 22. The first pipe section 21 is located in the bent concave part 1321 (as shown in FIG. 1 and FIG. 4). A bottom end of the second pipe section 22 is connected to the first header 11, and the inner chamber of the second pipe section 22 is connected to the inner chamber of the first header 11. It can be understood that the bottom end of the second pipe section 22 may alternatively be connected to the second header 12, and the inner chamber of the second pipe section 22 is connected to the inner chamber of the second header 12. In the embodiment shown in FIG. 1, the bottom end of the second pipe section 22 is connected to the first header 11, and the inner chamber of the second pipe section 22 is connected to the inner chamber of the first header 11.

Herein, it can be understood that the opening of the refrigerant adjustment container 2 is a bottom end opening of the second pipe section 22.

It can be understood that, in the heat pump system according to the embodiments of the present application, that the volume of the outdoor heat exchanger is greater than that of the indoor heat exchanger is used as an example. When the heat pump system switches from the cooling mode to the heating mode, the indoor heat exchanger serves as a condenser. Because injection space of the indoor heat exchanger is limited, excess refrigerant can be transferred into the refrigerant adjustment container 2 connected to the heat exchanger 1, and excess liquid refrigerant can be stored by using the refrigerant adjustment container 2, to improve an operating capability of the heat pump system. When the heat pump system switches from the heating mode to the cooling mode, the indoor heat exchanger serves as an evaporator, and the heat pump system needs more refrigerant to improve heat exchange efficiency. In this case, the liquid refrigerant in the refrigerant adjustment container 2 flows into the heat exchanger 1 to participate in heat exchange of the heat pump system, so as to improve heat exchange performance. In this way, the heat exchange apparatus according to the embodiments of the present application is used as a smaller-volume heat exchanger, so that when the heat pump system switches between the cooling mode and the heating mode, refrigerant in the heat pump system can be compensated and adjusted. Therefore, an amount of exchanged heat and an energy efficiency ratio on the indoor side are stabilized in both the cooling mode and the heating mode, thereby improving efficiency of the heat pump system.

In some embodiments, the heat exchanger 1 is a microchannel heat exchanger, and the heat exchange tube 13 is a flat tube, which is also referred to as a microchannel flat tube in the industry. Use of the flat tube helps decrease a weight of the heat exchanger and reduce a size of the heat exchanger. A plurality of channels are usually arranged, inside the flat tube, for refrigerant to flow. Adjacent channels are isolated from each other. A plurality of channels are arranged in a row, which together affect width of the flat tube. The flat tube is flat as a whole, its length is greater than its width, and its width is greater than its thickness. A length direction of the flat tube is a refrigerant flow direction determined by the foregoing channels in the flat tube.

Further, the heat exchanger 1 further includes fins 14, and the fins 14 are arranged between straight sections 131 of adjacent heat exchange tubes 13. In other words, as shown in FIG. 1, a plurality of heat exchange tubes 13 are spaced apart from each other, a fin 14 is provided between every two adjacent heat exchange tubes 13, and the fin 14 is at least partially connected to the heat exchange tube 13. In this way, heat exchange is performed by using the fin 14 and the heat exchange tube 13, to improve heat exchange efficiency. Herein, it should be explained that the fin 14 is shown in FIG. 1, but the fin 14 is not limited to being located only in a partial area between straight sections 131 of adjacent heat exchange tubes 13 shown in FIG. 1. In other words, the fin 14 can be arranged in an entire area between adjacent straight sections 131.

The bent section 132 of the heat exchange tube 13 is twisted about a longitudinal axis of the heat exchange tube 13 by a predetermined angle with respective to the straight section 131. It can be understood that, for example, before being bent, the heat exchange tube 13 extends horizontally, and the heat exchange tube 13 is twisted at an approximately middle position of the heat exchange tube 13 by a predetermined angle with respective to an extension direction of the heat exchange tube 13, so as to facilitate bending of the heat exchange tube 13 at the middle position. After the bending, the bent section 132 is formed at the approximate middle position.

In some embodiments, a cross-sectional shape of the first pipe section 21 is adapted to a cross-sectional shape of the bent concave part 1321. In other words, a size of the cross-sectional shape of the first pipe section 21 can be adapted to the cross-sectional shape of the bent concave part 1321, that is, the first pipe section 21 can be placed in the bent concave part 132. For example, as shown in FIG. 4, when the heat exchange tube 13 is bent into a V shape or an inverted V shape, a cross section of the first pipe section 21 may be circular. It can be understood that the present application is not limited thereto. For example, the cross section of the first pipe section 21 may alternatively be trapezoidal or the like. It can be understood that the heat exchange tube 13 is V-shaped. In addition, when the heat exchange tube 13 is bent into a C shape, the cross section of the first pipe section 21 may be a D shape or the like.

The second pipe section 22 extends in a longitudinal direction of the straight section 131 of the heat exchange tube 13 and is close to the straight section 131. In other words, as shown in FIG. 1, the second pipe section 22 extends in a same direction as the straight section 131, is located in front of the straight section 131, and is exactly opposite to the straight section 131 in a front-rear direction. The second pipe section 22 extends from bottom to top right, a top right end of the second pipe section 22 is connected to the first pipe section 21, and the inner chamber of the second pipe section 22 is connected to the inner chamber of the first pipe section 21. The first pipe section 21 is in the bent concave part 1321 of the bent section 132 of the heat exchange tube 13, and extends in the front-rear direction.

In this way, the first pipe section 21 of the refrigerant adjustment container 2 is placed in the bent concave part 132 of the bent section 132, and the second pipe section 22 extends in the extension direction of the straight section 131 and is close to the straight section 131, so that space can be sufficiently utilized, thereby saving space and reducing installation space occupation of the heat pump system. In addition, in a horizontal air intake mode, the first pipe section 21 is placed at a higher position, and in the heating mode, it is avoided that the refrigerant in the heat exchange tube 13 cannot flow up due to a gravity action of upper liquid refrigerant.

In some embodiments, a hydraulic diameter of the first pipe section 21 is greater than a bend radius of the bent section 132 and less than four times of the bend radius of the bent section 132. Therefore, in the heat exchange apparatus according to the embodiments of the present application, ineffective heat exchange space of the bent section 132 can be effectively used, and an effective heat exchange part of the heat exchanger 1 is not greatly affected. Herein, it should be understood that the "hydraulic diameter" should be construed as: when the first pipe section 21 is a circular pipe, the hydraulic diameter of the first pipe section 21 is a pipe diameter; when the first pipe section 21 is a non-circular pipe, the hydraulic diameter of the first pipe section 21 is four times of a cross-sectional area divided by a wetted perimeter, where the wetted perimeter refers to a perimeter of a cross section of a pipe that is wetted by fluid.

Further, the hydraulic diameter of the first pipe section 21 is the same as that of the second pipe section 22. It can be understood that the hydraulic diameter of the second pipe section 22 may alternatively be different from that of the first pipe section 21. Furthermore, the hydraulic diameter of the first pipe section 21 and the hydraulic diameter of the second pipe section 22 are both greater than the bend radius of the bent section 132 and less than four times of the bend radius of the bent section 132. That is, a hydraulic diameter of the refrigerant adjustment pipe is greater than the bend radius of the bent section 132 and less than four times the bend radius of the bent section 132.

In some embodiments, the hydraulic diameter of the refrigerant adjustment pipe is greater than ½ of a diameter of the either header. In other words, the hydraulic diameter of the first pipe section 21 and the hydraulic diameter of the second pipe section 22 are both greater than ½ of the diameter of the either header. In this way, a relatively greater effect on the heat pump system can be ensured. Moreover, in addition to facilitating connection, pipe sections can be used as few as possible, to meet requirements of compensation and adjustment.

When the second pipe section 22 is connected to the first header 11 and the inner chamber of the second pipe section 22 is connected to the inner chamber of the first header 11, the hydraulic diameter of the first pipe section 21 and the hydraulic diameter of the second pipe section 22 are both greater than ½ of the diameter of the first header 11. When the second pipe section 22 is connected to the second header 12 and the inner chamber of the second pipe section 22 is connected to the inner chamber of the second header 12, the hydraulic diameter of the first pipe section 21 and the hydraulic diameter of the second pipe section 22 are both larger than ½ of the diameter of the second header 12. Usually, the diameter of the first header 11 is the same as that of the second header 12, and in this case, the hydraulic diameter of the first pipe section 21 and the hydraulic diameter of the second pipe section 22 are greater than ½ of the diameter of the first header 11 and the second header 12.

In some embodiments, the refrigerant adjustment container 24 is higher than the either header in a horizontal direction. In other words, as shown in FIG. 1, the bottom end of the second pipe section 22 is connected to the first header 11 or the second header 12 and is connected to the inner chamber of the first header 11 or the inner chamber of the second header 12. The second pipe section 22 is located above the first header 11 or the second header 12, that is, the refrigerant adjustment container 2 is located above the first header 11 or the second header 12. When the heat pump system switches from the heating mode to the cooling mode, excess refrigerant in the refrigerant adjustment container 2 can enter the first header 11 or the second header 12 under a gravity action, to adjust an amount of refrigerant in the heat pump system during operating, so as to improve performance of the heat pump system. In other words, when the heat pump system switches to the cooling mode, the refrigerant can be replenished for the system in time by using gravity, and when the heat pump system is shut down, the refrigerant and refrigerating oil can be returned to the heat pump system.

In some specific embodiments, the bent section 132, without the fin 14, of the heat exchange tube 13 is provided with a support (not shown) for fastening the first pipe section 21. Specifically, the support adopts a sheet metal member, and a part with which the sheet metal member is in contact with the heat exchange tube 13 is provided with a flexible material such as soft rubber or foam rubber, to protect the heat exchange tube 13.

The sheet metal member can be inserted into a gap between adjacent straight sections 131 of straight sections 131 on both sides of the bent section 132 to achieve a windshield effect and to fasten the first pipe section 21.

Figure 5:
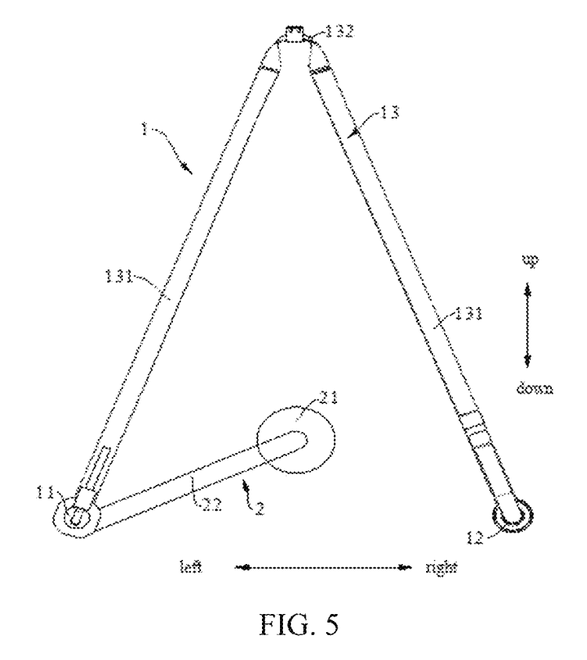
FIG. 5 is a schematic side view of a heat exchange apparatus according to another embodiment of the present application.
Figure 6:
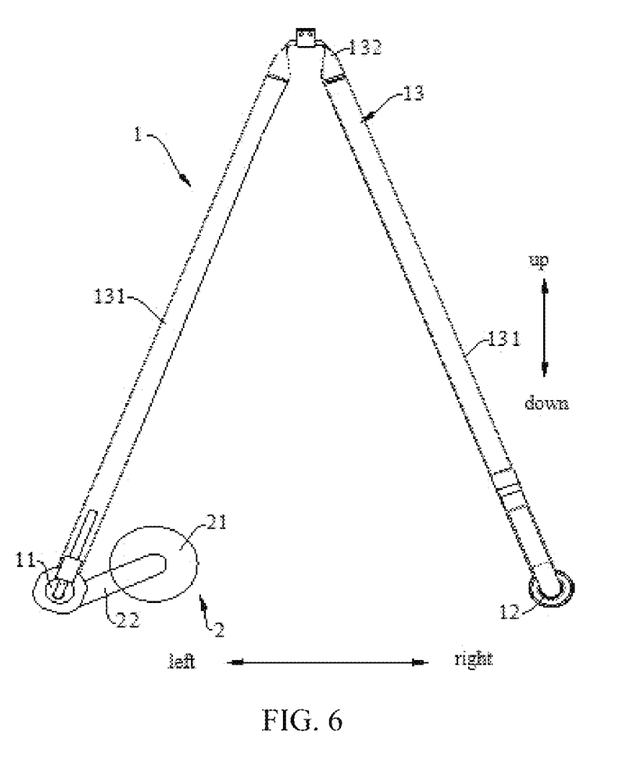
FIG. 6 is a schematic side view of a heat exchange apparatus according to still another embodiment of the present application.
Figure 7:
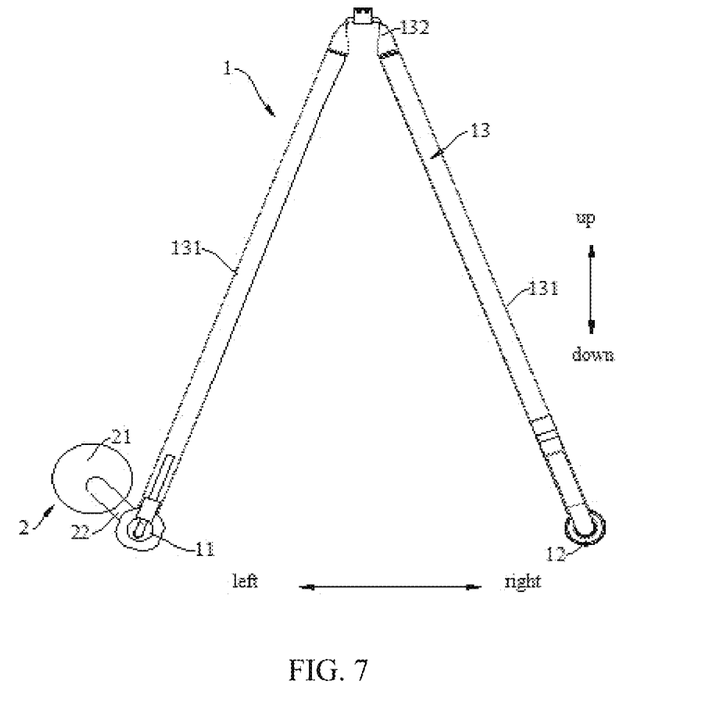
FIG. 7 is a schematic side view of a heat exchange apparatus according to yet another embodiment of the present application.

The following describes, with reference to the accompanying drawings FIG. 5 to FIG. 7, a heat exchange apparatus according to an embodiment of another aspect of the present application.

As shown in FIG. 5 to FIG. 7, the heat exchange apparatus according to this embodiment of the present application includes a heat exchanger 1 and a refrigerant adjustment container 2. The heat exchanger 1 includes a first header 11, a second header 12 and a plurality of heat exchange tubes 13, and two ends of each heat exchange tube 13 are respectively connected to the first header 11 and the second header 12 so as to connect the first header 11 and the second header 12. To be specific, as shown in FIG. 5 to FIG. 7, the first header 11 and the second header 12 both extend in a front-rear direction and are spaced apart in a left-right direction. One end of each heat exchange tube 13 is connected to the first header 11, and an inner chamber of the heat exchange tube 13 is connected to an inner chamber of the first header 11. The other end of the heat exchange tube 13 is connected to the second header 12, and the inner chamber of the heat exchange tube 13 is connected to an inner chamber of the second header 12.

The refrigerant adjustment container 2 has an opening, and the opening is connected to either of the first header 11 and the second header 12. To be specific, the opening of the refrigerant adjustment container 2 is connected to the inner chamber of the first header 11 or the inner chamber of the second header 12 so as to connect the inner chamber of the refrigerant adjustment container 2 and the inner chamber of the first header 11 or the inner chamber of the second header 12.

According to the heat exchange apparatus of this embodiment of the present application, the refrigerant adjustment container 2 connected to the first header 11 or the second header 12 is disposed, so that excess refrigerant can be stored in the refrigerant adjustment container 2. For example, that a volume of an outdoor heat exchanger is larger than a volume of an indoor heat exchanger is used as an example. When the heat pump system switches from the cooling mode to the heating mode, the indoor heat exchanger serves as a condenser. Because injection space of the indoor heat exchanger is limited, excess refrigerant can be transferred into the refrigerant adjustment container 2 connected to the heat exchanger 1, and excess liquid refrigerant can be stored by using the refrigerant adjustment container 2, to improve an operating capability of the heat pump system. When the heat pump system switches from the heating mode to the cooling mode, the indoor heat exchanger serves as an evaporator, and the heat pump system needs more refrigerant to improve heat exchange efficiency. In this case, the liquid refrigerant in the refrigerant adjustment container 2 flows into the heat exchanger 1 to participate in heat exchange of the heat pump system, so as to improve heat exchange performance. In this way, by means of disposing the refrigerant adjustment container 2, when the heat pump system switches between the cooling mode and the heating mode, refrigerant in the heat pump system can be compensated and adjusted. Therefore, an amount of exchanged heat and an energy efficiency ratio on the indoor side can be stabilized in both the cooling mode and the heating mode, thereby improving efficiency of the heat pump system.

In some optional embodiments, each heat exchange tube 13 includes straight sections 131 and a bent section 132 between the straight sections 131. To be specific, as shown in FIG. 5 and FIG. 6, the heat exchanger 1 is a bent heat exchanger, and the heat exchange tube 13 of the heat exchanger 1 is formed through bending. Each heat exchange tube 13 includes two straight sections 131 and one bent section 132. One straight section 131 extends from bottom to top right, and a top right end of the straight section 131 is connected to a left end of the bent section 132. The other straight section 131 extends from bottom to upper left, and a top left end of the straight section 131 is connected to a right end of the bent section 132, so that the heat exchange tube 13 is in an inverted V shape. It can be understood that a shape of the heat exchange tube 13 is not limited thereto. For example, the heat exchange tube 13 is bent to be V-shaped, C-shaped, or the like.

The refrigerant adjustment container 2 is located inside internal space of the heat exchanger 1. To be specific, as shown in FIG. 5 and FIG. 6, the refrigerant adjustment container 2 is located inside straight sections 131 of the heat exchange tube 13, that is, in an area in an inverted V shape enclosed by the two straight sections 131 and the bent section 132. That is, the refrigerant adjustment container 2 is located below the heat exchange tube 13 and located at the upper right of the first header 11 and the upper left of the second header 12.

Herein, it should be understood that the internal space of the heat exchanger 1 is understood as an area enclosed by the first header 11, the heat exchange tube 13, and the second header 12, and the area is not lower than positions of the first header 11 and the second header 12. In this way, the refrigerant adjustment container 2 is placed in the internal space of the heat exchanger 1, so that space can be sufficiently utilized, thereby saving space and reducing installation space occupation of the heat pump system.

It can be understood that when the refrigerant adjustment container 2 is placed above the first header 11 or the second header 12, and when the heat pump system switches from the heating mode to the cooling mode, excess refrigerant in the refrigerant adjustment container 2 can enter the first header 11 or the second header 12 under a gravity action, to adjust an amount of refrigerant in the heat pump system during operating, so as to improve performance of the heat pump system. In other words, when the heat pump system switches to the cooling mode, the refrigerant can be replenished for the system in time by using gravity, and when the heat pump system is shut down, the refrigerant and refrigerating oil can be returned to the heat pump system.

In some specific embodiments, the refrigerant adjustment container 2 is a refrigerant adjustment pipe, the refrigerant adjustment pipe includes a first pipe section 21 and a second pipe section 22, the second pipe section 22 is connected between the either header and the first pipe section 21, and the first pipe section 21 extends in an axial direction of the either header and is opposite to the bent section 132.

In other words, one end of the second pipe section 22 is connected to the first header 11 or the second header 12, and an inner chamber of the second pipe section 22 is connected to an inner chamber of the first header 11 or an inner chamber of the second header 12. The other end of the second pipe section 22 is connected to the first pipe section 21, and the inner chamber of the second pipe section 22 is connected to an inner chamber of the first pipe section 21. The first pipe section 21 extends in an axial direction of the first header 11 or the second header 12, that is, the first pipe section 21 is parallel to the first header 11 or the second header 12, and the first pipe section 21 is opposite to the bent section 132 in an up-down direction.

Specifically, as shown in FIG. 5, the second pipe section 22 extends from bottom to upper right, and an extension direction of the second pipe section 22 is slanted to the right at an angle with respect to an extension direction of a straight section 131 on the left side of the bent section 132. That is, the second pipe section 22 and the straight section 131 are staggered. A bottom end of the second pipe section 22 is connected to the first header 11, the inner chamber of the second pipe section 22 is connected to the inner chamber of the first header 11, and a top end of the second pipe section 22 is connected to the first pipe section 21. The inner chamber of the second pipe section 22 is connected to the inner chamber of the first pipe section 21, and the first pipe section 21 extends from front to rear and is located exactly under the bent section 132.

In some other specific embodiments, the refrigerant adjustment container 2 is a refrigerant adjustment pipe, and the refrigerant adjustment pipe includes a first pipe section 21 and a second pipe section 22. The second pipe section 22 is connected between the either header and the first pipe section 21, and the first pipe section 21 extends in an axial direction of the either header and is close to the either header.

In other words, one end of the second pipe section 22 is connected to the first header 11 or the second header 12, and the inner chamber of the second pipe section 22 is connected to the inner chamber of the first header 11 or the inner chamber of the second header 12. The other end of the second pipe section 22 is connected to the first pipe section 21, and the inner chamber of the second pipe section 22 is connected to the inner chamber of the first pipe section 21. The first pipe section 21 extends in the axial direction of the first header 11 or the second header 12, that is, the first pipe section 21 is parallel to the first header 11 or the second header 12, and the first pipe section 21 is close to the header connected to the end of the second pipe section 22.

Specifically, as shown in FIG. 6, the second pipe section 22 extends from bottom to upper right, and an extension direction of the second pipe section 22 is slanted to the right at a specific angle with respect to an extension direction of a straight section 131 on the left side of the bent section 132. That is, the second pipe section 22 and the straight section 131 are staggered. A bottom end of the second pipe section 22 is connected to the first header 11, the inner chamber of the second pipe section 22 is connected to the inner chamber of the first header 11, and a top end of the second pipe section 22 is connected to the first pipe section 21. In addition, the inner chamber of the second pipe section 22 is connected to the inner chamber of the first pipe section 21, and the first pipe section 21 extends from front to rear and is close to the first header 11. In this embodiment, an extension length of the second pipe section 22 is shorter than that of the second pipe section 22 in the embodiment shown in FIG. 5, so that the first pipe section 21 is no longer opposed to the bent section 132 in the up-down direction, and is deviated from the first header 11 by a relatively short distance and located at the upper right of the first header 11.

In some specific embodiments, a hydraulic diameter of the refrigerant adjustment pipe is greater than ½ of a diameter of the either header. In other words, a hydraulic diameter of the first pipe section 21 and a hydraulic diameter of the second pipe section 22 are both greater than ½ of the diameter of the either header.

As shown in FIG. 5 and FIG. 6, the second pipe section 22 is connected to the first header 11, and the inner chamber of the second pipe section 22 is connected to the inner chamber of the first header 11. The hydraulic diameter of the first pipe section 21 and the hydraulic diameter of the second pipe section 22 are both greater than ½ of a diameter of the first header 11.

It can be understood that the refrigerant adjustment container 2 is not limited to being in the internal space of the heat exchanger 1. For example, in some other optional embodiments, the refrigerant adjustment container 2 is located outside the heat exchange tube 13 and close to the either header. To be specific, the refrigerant adjustment container 2 is located outside the straight section 131 of the heat exchange tube 13 and is arranged close to a header connected to the refrigerant adjustment container 2. For example, as shown in FIG. 7, the refrigerant adjustment container 2 is located on the left side of the straight section 131 on the left side of the bent section 132 and is arranged close to the first header 11.

In some specific embodiments, the refrigerant adjustment container 2 is a refrigerant adjustment pipe, and the refrigerant adjustment pipe includes a first pipe section 21 extending in the axial direction of the either header and a second pipe section 22 connected between the either header and the first pipe section 21.

In other words, as shown in FIG. 7, the refrigerant adjustment container 2 includes the first pipe section 21 and the second pipe section 22. The pipe section 21 extends in a front-rear direction, that is, an extension direction of the first pipe section 21 is the same as that of the first header 11. The first pipe section 21 and the first header 11 are parallel to each other, and the first pipe section 21 is located at the upper left of the first header 11. A top end of the second pipe section 22 is connected to the first pipe section 21, and an inner chamber of the second pipe section 22 is connected to an inner chamber of the first pipe section 21. A bottom end of the second pipe section 22 is connected to the first header 11, and the inner chamber of the second pipe section 22 is connected to an inner chamber of the first header 11. The second pipe section 22 extends from bottom to upper left, and an extension direction of the second pipe section 22 is slanted to the left at a specific angle with respect to an extension direction of a straight section 131 on the left side of the bent section 132. That is, the second pipe section 22 and the straight section 131 are staggered.

In some embodiments, the refrigerant adjustment container 2 is a refrigerant adjustment tank. It can be understood that the refrigerant adjustment container 2 may be a refrigerant adjustment pipe or a refrigerant adjustment tank. The present application is not limited thereto. In other words, a cross-sectional shape of the refrigerant adjustment container 2 is not limited to those shown in FIG. 1 and FIG. 5, and another shape may alternatively be used.

In some specific embodiments, the refrigerant adjustment container 2 is higher than the either header in a horizontal direction. In other words, the refrigerant adjustment container 2 is higher than, in the horizontal direction, the header connected to the refrigerant adjustment container 2. For example, in the embodiment shown in FIG. 8, the refrigerant adjustment container 2 is connected to the first header 11 with their inner chambers connected to each other, and the refrigerant adjustment container 2 is located above the first header 11. In this way, when the heat pump system switches between a cooling mode and a heating mode, excess refrigerant in the refrigerant adjustment container 2 can enter the first header 11 under a gravity action, to adjust an amount of refrigerant in the heat pump system during operating, so as to improve performance of the heat pump system.

Figure 8:
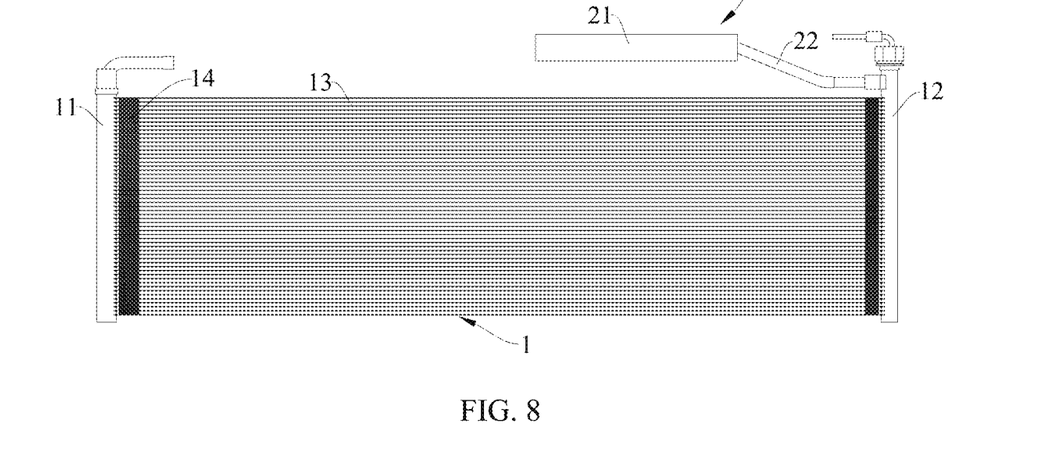
FIG. 8 is a schematic side view of a heat exchange apparatus according to still yet another embodiment of the present application.

It can be understood that the heat exchange apparatus in the present application is not limited to using a bent heat exchanger. For example, in some other optional embodiments, the heat exchanger 1 is a flat heat exchanger. In other words, the heat exchange tube 13 of the heat exchanger 1 is not bent, and the heat exchange tube 13 is straight. As shown in FIG. 8, the left end of the heat exchange tube 13 is connected to the first header 11 and an inner chamber of the heat exchange tube 13 is connected to the inner chamber of the first header 11; the right end of the heat exchange tube 13 is connected to the second header 12, and inner chamber of the heat exchange tube 13 is connected to the inner chamber of the second header 12.

Further, the refrigerant adjustment container 2 includes a first pipe section 21 and a second pipe section 22. One end of the second pipe section 22 is connected to the second header 12, and an inner chamber of the second pipe section 22 is connected to the inner chamber of the second header 12. The other end of the second pipe section 22 is connected to the first pipe section 21, an inner chamber of the first pipe section 21 is connected to the inner chamber of the second pipe section 22, and the first pipe section 21 extends in a longitudinal direction of the heat exchange tube 13 (the direction shown in FIG. 8).

In other words, as shown in FIG. 8, the first header 11 and the second header 12 are arranged in sequence from left to right and spaced apart from each other, each heat exchange tube 13 extends in a left-right direction and is connected between the first header 11 and the second header 12, and the inner chamber of the heat exchange tube 13 is connected to the inner chamber of the first header 11 and the inner chamber of the second header 12. The second pipe section 22 extends from an outer surface of the second header 12 to the upper left, and the inner chamber of the second pipe section 22 is connected to the inner chamber of the second header 12. The left end of the second pipe section 22 is connected to the first pipe section 21, and the inner chamber of the second pipe section 22 is connected to the inner chamber of the first pipe section 21. The first pipe section 21 extends from left to right and is located above the heat exchange tube 13. Specifically, a hydraulic diameter of the first pipe section 21 is greater than a hydraulic diameter of the second pipe section 22.

In the description of this specification, descriptions with reference to terms such as "an embodiment", "some embodiments", "example", "specific example", or "some examples" mean that specific features, structures, materials, or characteristics described with reference to the embodiment or example are included in at least one embodiment or example of the present application. In this specification, illustrative descriptions of the foregoing terms do not necessarily refer to a same embodiment or example. Moreover, the described specific features, structures, materials, or characteristics can be combined in any one or more embodiments or examples in an appropriate manner. In addition, those skilled in the art can combine different embodiments or examples described in the specification and features of the different embodiments or examples without contradicting each other.

In the present application, unless otherwise expressly specified and defined, terms such as "install", "connect", "connected to", and "fasten" should be understood in a broad sense. For example, unless otherwise expressly defined, a "connection" may be a fixed connection, may be a detachable connection, or may be an integrated connection; or may be a mechanical connection, or an electrical connection or, mutually communicative connection; or may be a direct connection, or an indirect connection through an intermediate medium; or may be an inner connection between two elements, or interaction between two elements. Those of ordinary skill in the art can understand specific meanings of the foregoing terms in the present application with reference to specific circumstances.

In the present application, unless otherwise expressly specified and defined, that a first feature is "above" or "below" a second feature means that the first feature and the second feature are in direct contact, or are in indirect contact through an intermediate medium. Moreover, that the first feature is "over", "above", or "on" the second feature may mean that the first feature is over or obliquely above the second feature, or merely mean that the first feature is higher than the second feature in terms of heights. That the first feature is "under", "below", "under", or "beneath" the second feature may mean that the first feature is under or obliquely below the second feature, or merely mean that the first feature is lower than the second feature in terms of heights.

Although the embodiments of the present application are shown and described above, it can be understood that the foregoing embodiments are examples and shall not be construed as a limitation to the present application. Persons of ordinary skill in the art may make changes, modifications, substitutions, and variants based on the foregoing embodiments within the scope of the present application.

The invention claimed is:

1. A heat exchange apparatus, comprising: a heat exchanger and a refrigerant adjustment container with an opening, wherein the heat exchanger comprises a first header, a second header and a plurality of heat exchange tubes, two ends of each heat exchange tube are respectively connected to the first header and the second header so as to connect the first header and the second header, and the opening of the refrigerant adjustment container is connected to either of the first header and the second header, wherein each heat exchange tube comprises two straight sections and a bent section between the two straight sections, and the refrigerant adjustment container is located below the bent sections of the plurality of heat exchange tubes and between the two straight sections of the plurality of heat exchange tubes, and a part of the refrigerant adjustment container is located at an upper right of the first header and an upper left of the second header;
- wherein the refrigerant adjustment container comprises a first pipe section extending in an axial direction of the either header and close to the either header and a second pipe section connected between the either header and the first pipe section; and
- an extension direction of the second pipe section is slanted to the right at a specific angle with respect to an extension direction of the straight section on a left side of the bent section.

2. The heat exchange apparatus according to claim 1, wherein the refrigerant adjustment container is a refrigerant adjustment pipe.

3. The heat exchange apparatus according to claim 2, wherein a hydraulic diameter of the refrigerant adjustment pipe is greater than ½ of a diameter of the either header.

4. A heat pump system, comprising: a compressor, an indoor heat exchanger, and an outdoor heat exchanger, wherein an internal volume of one of the outdoor heat exchanger and the indoor heat exchanger is larger than that of the other heat exchanger,
- and wherein the other heat exchanger comprises a heat exchanger and a refrigerant adjustment container with an opening,
- wherein the heat exchanger comprises a first header, a second header and a plurality of heat exchange tubes, two ends of each heat exchange tube are respectively connected to the first header and the second header so as to connect the first header and the second header, and the opening of the refrigerant adjustment container is connected to either of the first header and the second header, wherein each heat exchange tube comprises two straight sections and a bent section between the two straight sections, and the refrigerant adjustment container is located below the bent sections of the plurality of heat exchange tubes and between the two straight sections of the plurality of heat exchange tubes, and a part of the refrigerant adjustment container is located at an upper right of the first header and an upper left of the second header;
- wherein the refrigerant adjustment container comprises a first pipe section extending in an axial direction of the either header and close to the either header and a second pipe section connected between the either header and the first pipe section;
- an extension direction of the second pipe section is slanted to the right at a specific angle with respect to an extension direction of the straight section on a left side of the bent section.

5. The heat pump system according to claim 4, wherein a hydraulic diameter of the refrigerant adjustment container is greater than ½ of a diameter of the either header.

* * * * *